United States Patent [19]
Payne

[11] 4,165,134
[45] Aug. 21, 1979

[54] PNEUMATIC POWDER FLOW DIVERTING DEVICE
[75] Inventor: Robert D. Payne, Countryside, Ill.
[73] Assignee: The Continental Group, Inc., New York, N.Y.
[21] Appl. No.: 825,240
[22] Filed: Aug. 16, 1977
[51] Int. Cl.² ............................................. B65G 53/16
[52] U.S. Cl. ...................................... 406/1; 406/181
[58] Field of Search ...................... 302/27, 28, 42, 19; 239/15, 124; 118/308, 310, 311, 312, 627, 629; 137/807, 829, 830, 832, 835, 836; 222/193; 141/131; 427/181, 183, 236, 345; 302/64, 66; 243/38

[56] References Cited
U.S. PATENT DOCUMENTS

| 3,053,276 | 9/1962 | Woodward | 137/829 X |
| 3,431,027 | 3/1969 | Kochey | 302/28 |
| 3,458,237 | 7/1969 | Noe | 302/42 X |
| 3,578,009 | 5/1971 | Spyropoulus | 137/832 |
| 4,025,664 | 5/1977 | Gerek et al. | 427/183 |

FOREIGN PATENT DOCUMENTS

| 814285 | 9/1951 | Fed. Rep. of Germany | 302/64 |
| 2035387 | 1/1972 | Fed. Rep. of Germany | 243/38 |

Primary Examiner—Robert B. Reeves
Assistant Examiner—James L. Rowland
Attorney, Agent, or Firm—Charles E. Brown

[57] ABSTRACT

A pneumatic powder flow diverting device for use in conjunction with an apparatus for the electrostatic coating of can bodies which are sequentially positioned for receiving the powder coating. A pneumatic switching device is provided so that powder is directed to the position of a can body to be coated only when a can body is located in that position. A return line returns the powder flow to a powder source during the time between can bodies. The pneumatic switching device utilizes small air jets for diverting the powder flow between the coating apparatus and the return line with a minimal amount of air being required to effect the switching operation.

6 Claims, 7 Drawing Figures

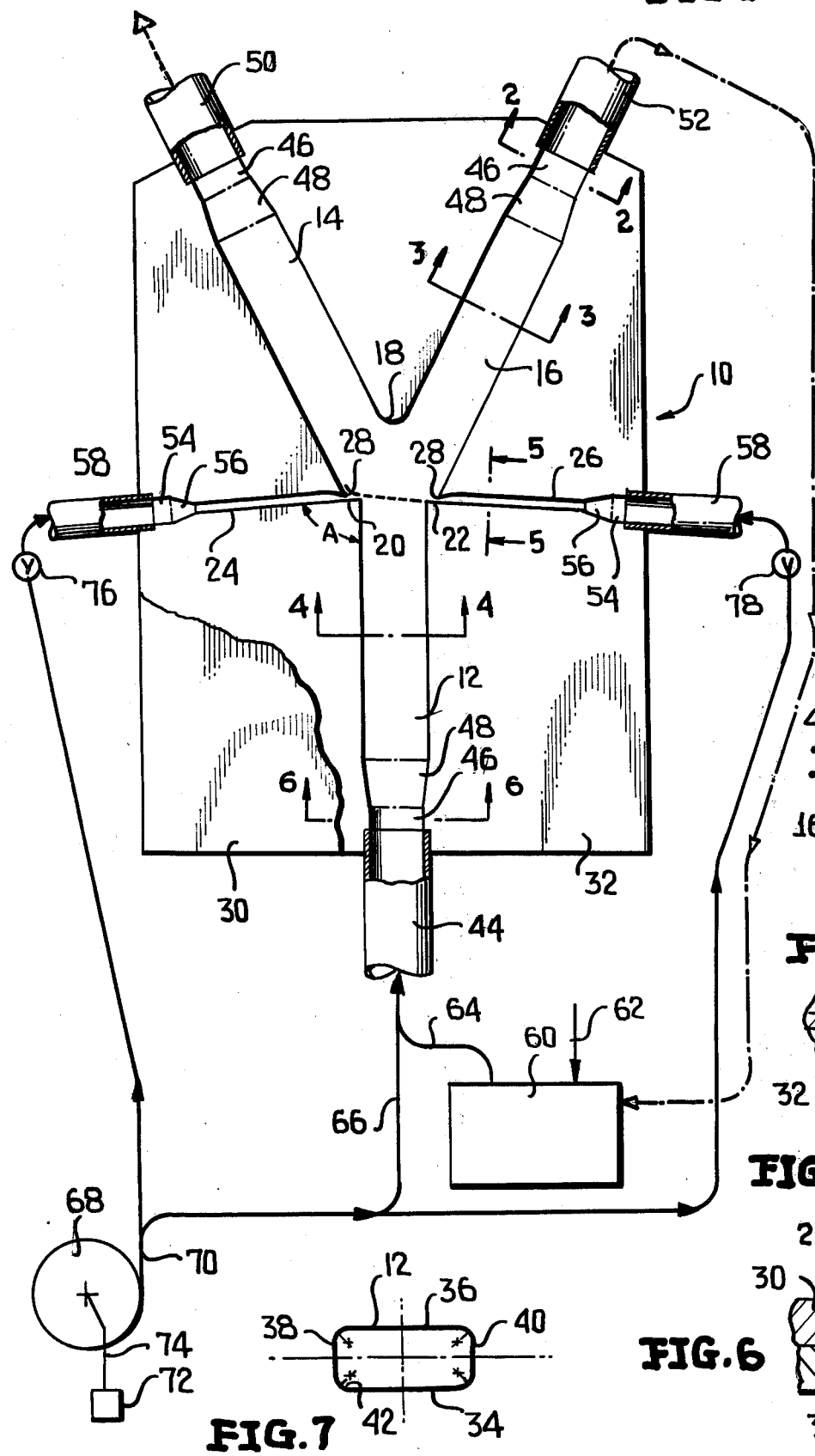

PNEUMATIC POWDER FLOW DIVERTING DEVICE

This invention relates in general to new and useful improvements in apparatus for the electrostatic powder coating of individual members, such as can bodies, and more particularly to a switching device for use in conjunction with such apparatus to selectively flow a powder-gas admixture to either the coating apparatus or to the return line.

There has been previously developed apparatus for the sequential electrostatic coating of individual can bodies with such apparatus including flow diverting means operable so that when a can body is not in position for coating, the powder flow is diverted into a return line. Such an apparatus is the subject of U.S. Pat. No. 3,901,184 of applicant and another.

It is pointed out here that the diverter is critical to the powder coating system operation because it switches powder either through the applicator when a can body is present for coating or back to the powder source during the time between can bodies. This switching prevents the unwanted spraying of powder on the outside of the can body during its transfer into another of the coating stations. It also provides a total control and containment of the powder coating material so that ultimately 99% of the material which enters the system may be utilized.

The pneumatic powder flow diverter of my prior U.S. Pat. No. 3,901,184 was purposely conceived and developed as a device with no moving parts because of concern about powder build-up and powder degradation within a moving-part device. Low melting-point, fine powders, such as epoxies and acrylics, known to impact-fuse within powder flow devices, especially between relatively moving surfaces. Powder build up can continuously change the operational conditions or ultimately disable a powder flow device. Powder agglomeration (two or more powder particles stuck together), and powder attrition (fracture of a powder particle into two or more parts) can change the physical characteristics of the powder. A powder flow diverter with no moving parts was developed as disclosed in my prior U.S. Pat. No. 3,901,184 to avoid these potential instabilities.

While the powder flow diverter of my prior U.S. Pat. No. 3,901,184 has proved to be operable, it is not without its shortcomings. At least half of the volume of the disk-shaped cavity inside the vortex-type diverter is unnecessary for either powder path through the device. This "dead space" becomes a trap where powder can build up and later break away. This build-up and subsequent break-away, which occurs at random intervals, constantly changes the pneumatic impedance of the diverter. This, in turn, influences the delivery rate of coating powder through the diverter which ultimately limits the repeatability of the dry powder weight on the can bodies being coated.

Powder build-up in the dead-space within the vortex-type diverter enhances the formation of agglomerates. If these agglomerates are sprayed into a can body, they may disrupt an already applied coating or create undesirable coating irregularities. If these agglomerates are returned through the closed-loop recovery system, they will be rejected by a screening device as unusable, but the powder utilization economics will be adversely affected.

Finally, while traversing the vortex-type diverter, the powder stream is forced to execute a 90° turn regardless of which outlet the powder passes through. This 90° change in direction is accomplished by air jets, one of which is already turned on. It is to be understood that the velocity of the powder stream is changed only at the expense of the potential energy previously stored in the compressed air. Since the compressed air carrying the powder must be supplied in a clean (oil-free) and dry (dew point on the order of −10° F.) condition, it will be seen that a large quantity of air is required with a resultant capital and operating cost for the air drying system.

In accordance with this invention, it is proposed to provide a pneumatic powder flow diverting device wherein the amount the path of the powder-gas admixture must be diverted during the switching operation is held to a minimum. Thus, there is practically no loss in the velocity of the powder stream. Further, by providing a specific relationship between the various flow lines, an air jet of a minimal size may be utilized.

It is acknowledged that generally Y-shaped fluid valves are known. Preferable of such arrangements are the patents to Hausmann U.S. Pat. No. (3,016,063) and Woodward U.S. Pat. No. (3,053,276). The Hausman device is a complex device which requires a pumping action within the system such that could not possibly be utilized in conjunction with a powder flow. Further, it will be readily apparent that the pumping action requires considerable air to effect the operation thereof.

The Woodward patent has several deficiencies as far as the handling of powder is concerned. First of all, it utilizes a mechanical switch. Secondly, it is an amplifier wherein air greatly in excess of the amount required merely to effect diverting is utilized.

In accordance with this invention, there has been provided a very simple pneumatic powder flow diverting device wherein a supply, a delivery line and a return line are arranged in a Y-pattern and extending in generally opposed relation at opposite sides of the supply line are diverter lines for supplying very limited volume air jets to effect the switching operation. The air jets are disposed at an acute angle to the supply so that they do not direct powder into one another. The volume of air required to effect the switching operation is held to a minimum with all of the flow being direct and without the aid of a return cycle or a switching element.

With the above and other objects in view that will hereinafter appear, the nature of the invention will be more clearly understood by reference to the following detailed description, the appended claims and the several views illustrated in the accompanying drawing.

IN THE DRAWING

FIG. 1 is a schematic view in plan with parts broken away and showing a section of the diverting device.

FIG. 2 is a transverse vertical sectional view taken along the line 2—2 of FIG. 1 and shows the cross section of the return line as it leaves the diverting device.

FIG. 3 is a transverse sectional view taken along the line 3—3 of FIG. 1 and shows the typical cross section of both the delivery line and the return line.

FIG. 4 is a transverse vertical sectional view taken along the line 4—4 of FIG. 1 and shows the cross section of the supply line.

FIG. 5 is a transverse vertical sectional view taken along the line 5—5 of FIG. 1 and shows a cross section of one of the diverter lines.

FIG. 6 is a transverse sectional view taken along the line 6—6 of FIG. 1 and shows the cross section of the supply line at the entrance in thereof.

FIG. 7 is an enlarged schematic view showing the typical cross section of the supply line, the delivery line and the return line.

Referring now to the drawings in detail, it will be seen that the pneumatic powder flow diverting device is generally identified by the numeral 10 and includes a supply line 12, a delivery line 14 and the return line 16 all arranged in a generally Y-shaped pattern. Each of the lines 12, 14 and 16 is of a generally rectangular cross section with rounded corners as is shown in FIGS. 3, 4 and 7. It is to be understood that the cross section of the lines 12, 14 and 16 is such that there is a full flow through each of the lines and there is no tendency for entrained powder to be retained within the lines.

It is to be noted that the delivery line 14 and the return line 16 intersect in a generally V-shaped arrangement with there being a rounded corner 18 opposing the supply line 12. Further, the supply line is intersected with the delivery line 14 and the return line 16 in their area of intersection at a point where the intersection is still of a greater width than the lines 12, 14 and 16, thus providing walls 20, 22 on opposite sides of the supply line 12. The walls or shoulders 20, 22 form wall portions of diverter lines 24, 26 respectively. The diverter lines 24, 26 are in generally opposed relation, but are disposed at an angle A to the supply line 12 which is less than 90°, the preferred angle being on the order of 85°. The diverter lines 24, 26 are so oriented with respect to each other and the supply line 12 so as to prevent blowing one into the other.

Referring now most specifically to FIGS. 3, 4, 5 and 7, it will be seen that each of the lines 12, 14 and 16 are of the same height and same width. On the other hand, the diverter lines 24, 26, while they are the same height as the lines 12, 14 and 16, are much narrower. In addition, each of the diverter lines 24, 26 is provided with a restricted outlet 28.

In order that the illustrated construction of the diverting device 10 may be fully understood, at least for purposes of illustration, the diverting device 10 is formed of two sheets 30, 32 of plastics material which have been formed with the various lines 12, 14, 16, 24 and 26 therein. In FIG. 1, for the most part the sheet 30 has been omitted so as to clearly illustrate the configurations of the various lines.

As set forth above, the typical cross section of the lines 12, 14 and 16 is rectangular with rounded corners. Thus each of the lines 12, 14 and 16, with reference to FIG. 7, includes a bottom side 34, a top side 36, two ends 38, 40, and a rounded corner 42 between each adjacent side and end. Inasmuch as in a square cornered rectangular tube there is substantially no air flow in the corners, by rounding the corners of each of the lines 12, 14 and 16, it will be seen that there will be full flow through each of the lines at all times and, therefore, no possibility of powder drop out.

It is to be noted that the supply line 12 is a continuation of a supply tube 44 which opens into a cylindrical cross sectional portion 46 which is modified to be of the generally rectangular cross section by way of a transition section 48, as is best shown in FIG. 6.

Outlet ends of the delivery line 14 and the return line 16 are of a like configuration, each including a transition section 48 and a cylindrical portion 46. The delivery line 14 opens into a delivery tube 50 which is connected to a conventional powder applicator which may be of the type disclosed in my prior U.S. Pat. No. 3,901,184. In a like manner, the cylindrical portion of the return line 16 opens into a return tube 52.

Each of the diverter lines 24, 26 includes a cylindrical entrance portion 54 which is coupled by a transition section 56 to the respective line. A supply tube 58 is connected to each of the cylindrical portions 54.

It will be seen that the system includes a powder source 60 to which a powder supply line 62 is coupled. A powder delivery line 64 extends from the powder source 60 into the supply tube 44 wherein it is entrained in the gas supplied to the supply tube 44 through a supply line 66. Returning powder-gas admixture is directed into the powder source 60 through the return tube 52.

At this time it is pointed out that the gas, for economy reasons, is preferably air. Further, this air is supplied by suitable pump or compressor 68 which has a delivery line 70 to which are coupled the tubes 58 and the line 66. The air supplied by the compressor or pump 68 must be clean (oil-free) and dry (dew point on the order of $-10°$ F.). Accordingly, there is provided a conventional air drying system which is generally identified by the numeral 72 with the inlet of the pump or compressor 68 being coupled thereto by means of a line 74.

In order to control the flow of the powder-gas admixture from the supply line 12 to either the delivery line 14 or the return line 16, the tubes 58 have incorporated therein control valves 76, 78. The valves 76, 78 may be of any quick acting type.

Operation

During the coating of can bodies, the powder-gas admixture is supplied into the diverting device 10 through the tube 44 with the admixture flowing into the supply line 12. The valve 78 is opened with a gas or air jet coming out of the diverter line 26 and diverting the admixture into the delivery line 14. When the coating of a can body has been completed, the valve 78 is closed and the valve 76 is open so that the diverter line 24 is energized, diverting the admixture from the supply line 12 into the return line 16. The system continues to operate in this sequence with the valves being controlled in accordance with the positioning of the can body to be coated.

The diverting device has been operated at a rate equivalent to two hundred and ten cans per minute. Powder flow was provided at forty pounds per hour by commercial powder dispensers and the switching time was measured to be less than 0.015 second and reproducible within 0.003 second. This switching time and reproducibility is considered to be more than accurate for the available coating time of 0.190 second at the rate of two hundred and ten cans per minute.

At this time it is pointed out that inasmuch as the admixture is being diverted only through a slight angle into either the delivery line 14 or the return line 16, there is very little energy loss during this diverting. Further, since the angular change is very small, the volume of the air jets from the diverter lines 24, 26 is quite small. In addition, it is pointed out here that the rectangular cross section of the lines 12, 14 and 16 has been found to be highly advantageous in that a rectangular shaped powder-gas admixture stream is found to be the most easily redirected by an air jet. The desirability of the rectangular cross section occurs because the air jet acting to redirect the admixture stream must be of sufficient velocity to change the direction of the widest part of the admixture stream. Thus, if the admixture stream is not of uniform width (for example, circular) then the part of the jet air which does not strike the widest part of the admixture stream is higher in velocity than is needed. Thus, more jet air is consumed to divert an admixture stream of circular cross section than to divert an admixture stream of rectangular cross section.

It has been found that consumption of air by the diverting lines 24, 26 is approximately 40% of that required by the vortex-type diverter of my U.S. Pat. No. 3,901,184 which provides for a material reduction in not only the operating cost, but also capital outlay to build the system.

Although only a preferred embodiment of the powder flow diverting device has been specifically illustrated and described herein, it is to be understood that minor variations may be made therein without departing from the spirit and the scope of the invention, as defined by the appended claims.

I claim:

1. A pneumatic powder flow diverting device comprising a powder-gas admixture supply line, a delivery line and a return line for selectively receiving a powder-gas admixture from said supply line, said delivery line and said return line being arranged in a V pattern and in intersecting relation to define an intersection tapering towards said supply line; said supply line, said delivery line and said return line all being of substantially the same cross section adjacent said intersection, said supply line opening directly into said intersection at a point where the intersection is of a width greater than the width of said supply line with there being a shoulder at each side of said supply line, and diverter lines opening into said intersection on opposite sides of said supply line immediately adjacent said shoulders.

2. The diverting device of claim 1 wherein said diverter lines are of a materially reduced cross section as compared to said supply line, said delivery line and said return line.

3. The diverting device of claim 2 wherein all of said lines are generally rectangular in cross section and of the same height; and at least said supply line, said delivery line and said return line have rounded corners for eliminating powder build up areas.

4. The diverting device of claim 1 wherein said diverter lines are in generally opposed relation and each diverter line is disposed at an angle less than 90° and on the order of 85° to prevent powder from being diverted into the other of said diverter lines.

5. The diverting device of claim 4 wherein said angle is on the order of 85°.

6. The diverting device of claim 1 wherein there is a powder supply and an air supply connected to said supply line, and said return line is connected to said powder supply, and wherein said air supply is also coupled to said diverter lines and is oil free and has a dew point on the order of −10° F.

* * * * *